United States Patent
Regazzi et al.

[19]

[11] Patent Number: 5,844,469
[45] Date of Patent: Dec. 1, 1998

[54] COMBINED ELECTRONIC IGNITION AND ALARM SYSTEM

[75] Inventors: Gianni Regazzi; Alessandro Venturoli, both of Bologna; Andrea Sani, Ferrara, all of Italy

[73] Assignee: Ducati Energia S.P.A., Bologna, Italy

[21] Appl. No.: 742,485

[22] Filed: Nov. 1, 1996

[30] Foreign Application Priority Data

Nov. 6, 1995 [IT] Italy .......................... MI95 A 002280

[51] Int. Cl.⁶ ................................................. B60R 25/10
[52] U.S. Cl. .................... 340/426; 340/428; 307/10.2; 307/10.5; 180/287
[58] Field of Search ................................ 340/426, 425.5, 340/428, 429, 430; 307/10.2, 10.3, 10.4, 10.5, 106; 180/287

[56] References Cited

U.S. PATENT DOCUMENTS

| | | | |
|---|---|---|---|
| 4,274,080 | 6/1981 | Brunken | 340/426 |
| 4,738,334 | 4/1988 | Weishaupt | 180/287 |
| 4,858,453 | 8/1989 | Namazue | 70/278 |
| 5,519,376 | 5/1996 | Iijima | 340/426 |
| 5,606,306 | 2/1997 | Mutoh et al. | 340/426 |
| 5,610,574 | 3/1997 | Mutoh et al. | 340/426 |
| 5,616,966 | 4/1997 | Fischer et al. | 307/10.5 |
| 5,635,900 | 6/1997 | Hasegawa et al. | 340/426 |
| 5,659,291 | 8/1997 | Kennedy et al. | 340/457 |
| 5,670,933 | 9/1997 | Hayashi | 340/426 |

*Primary Examiner*—Thomas Mullen
*Assistant Examiner*—Nina Tong
*Attorney, Agent, or Firm*—Young & Thompson

[57] ABSTRACT

An electronic ignition and alarm system for motorcycles. An electronic circuit for reading a coded signal emitted by a code-generating integrated circuit inside the ignition key, can be connected inductively or by electric contact means to a microcontroller programmed to enabling the operation of the ignition circuit of the engine after identification of the coded-signal. The coded-signal reader and the microcontroller are fed by a power source comprising a capacitor for storing the energy supplied by the voltage generator of the ignition circuit of the motorcycle. The energy storage capacitor can be connected to the voltage generator via a first low-impedance circuit comprising an electronic trigger switch deactivated by a control circuit which controls the charging voltage of the energy storage capacitor upon start-up of the engine, before activation of the ignition circuit, or, respectively, via a high-impedance circuit which maintains the charging voltage of the capacitor to reduce current drainage of the voltage generator by the capacitor during running of the engine.

13 Claims, 4 Drawing Sheets

COMBINED ELECTRONIC IGNITION AND ALARM SYSTEM

BACKGROUND OF THE INVENTION

The present invention relates to an electronic ignition for motorcycles combined with an alarm system.

The electronic alarm systems currently used in motorcycles in most cases consist of an accessory system, separately provided in respect to the electronic ignition unit, with the aim of inhibiting or enabling of the ignition depending on a control signal provided by an external device acting mainly on an ignition-stop control device.

These alarm systems presently in use suffer of some drawbacks including the need to be enabled every time the engine is stopped, or disabled before starting, as well as require an external power source generally provided by a battery. Moreover, since the alarm system forms an accessory element outside the ignition, it can be easily identified and neutralized.

In the field of motor vehicles, it is becoming increasingly common to use a new type of alarm system comprising a coded-signal generating electronic device, known as "transponder", inside the ignition key. A transponder device substantially consists of an electronic chip programmed with a coded signals connected to a receiving and transmitting antenna; if excited by an electromagnetic wave at a suitable frequency, the transponder generates a response signal provided by amplitude modulation of the same carrier wave with a code signal inside the chip, which are different for each transponder. The ignition console of the vehicle comprises a coil acting in turn as a transmitting and receiving antenna for both emitting the carrier wave to the transponder and receiving the modulated and coded wave.

Figure 1:
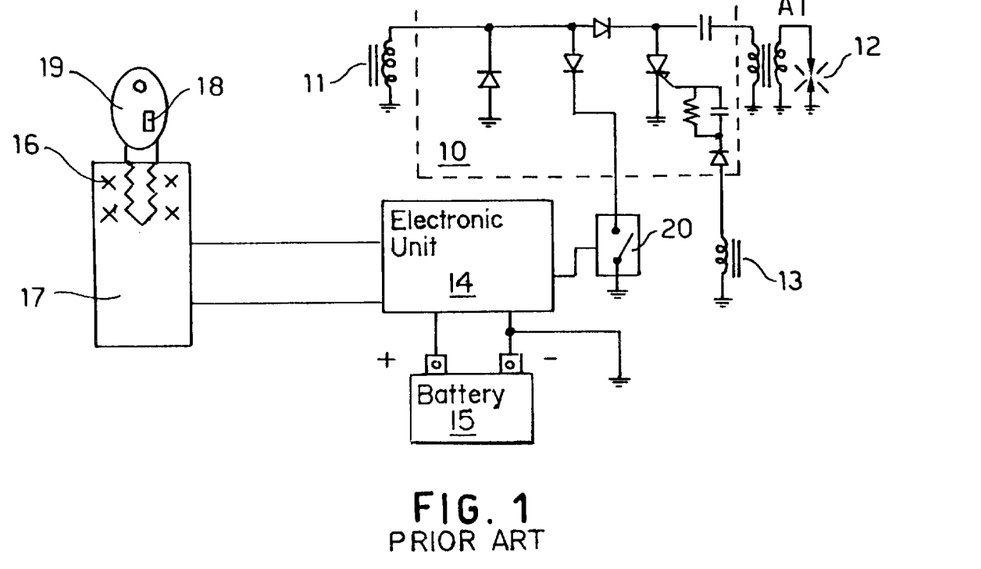
FIG. 1 is a diagram of an electronic ignition provided with a conventional transponder-type alarm system according to the prior art.

In particular, as shown by way of example in FIG. 1, such an electronic ignition, schematically indicated by the circuit lock 10, is normally fed by a coil 11 of the voltage generator of the motor vehicle providing the energy necessary for the sparking plugs 12 of the engine, depending on a timing signal provided by a pick-up 13, or in some other way. An electronic unit 14, powered by a battery 15, comprises a wave generating circuit to send a carrier wave to an antenna 16 in the engine ignition console 17, and towards the transponder 18 inside in the ignition key 19 of the motor vehicle. The transponder 18 in turn generates a set of modulated pulses which are again received and read by the electronics unit 14 to be sent to a microcontroller performing a comparison between the received coded signal and reference coded data in a memory of the microcontroller; if the code emitted by the transponder 18 is recognized as being correct, the system enables the ignition circuit 10.

A system of this type can be neutralized by simply interrupting the wires connecting read electronic unit 14 to the engine-stop control 20.

SUMMARY OF THE INVENTION

An object of the present invention is to provide an electronic ignition device combined with an alarm system, designed for application to motorcycles and to overcome the drawbacks of previously known transponder-type ignition devices.

In particular, an object of the present invention is to provide an electronic ignition device for motorcycles, combined with an electronic alarm system which is extremely safe and reliable in use since it makes it practically impossible to disable the alarm system by cutting the connection wires or by interfering with the electrical and/or mechanical components of the motorcycle, other than by replacing the entire ignition device.

Another object is to provide an electronic ignition device comprising an electronic alarm system of transponder type, or an integrated circuit for generating a secret code which does not require battery powering, since the alarm system is able to use the power supply provided by the voltage generator for the ignition circuit of the motorcycle, at the start-up of the engine.

These and other objects of the invention are achieved by an electronic ignition combined with an alarm system.

According to the operating principle of an ignition and alarm system of the invention, use is made of a transponder-type alarm system comprising a special power supply circuit for an electronic reader of a coded signal provided by the transponder of the ignition key, and a code identification microcontroller enabling and disabling the ignition circuit, said power supply circuit and microcontroller being housed inside a single protective casing; the alarm system power supply circuit in turn comprises an energy storage capacitor which is rapidly charged upon start-up of the engine and kept at the charging voltage by the same voltage generator of the engine ignition circuit; the charging of this alarm system power supply capacitor occurs rapidly during the first revolution or revolutions of the engine via a first low-impedance circuit comprising an electronic switch means operationally connected to a voltage control circuit controlling the charging voltage of the capacitor. The charge of the alarm-system power supply capacitor is then kept at a regulated value by a high-impedance voltage-holding circuit; therefore, when the combustion engine is running and the alarm system is in a pre-activated or stand-by condition, a strong drainage of current by the voltage generator is prevented, avoiding to compromise the performance of the ignition device.

BRIEF DESCRIPTION OF THE DRAWINGS

The combined electronic ignition device and alarm system for motorcycles according to the present invention will be illustrated in greater detail hereinbelow, with reference to the examples of the accompanying drawings, in which.

DESCRIPTION OF THE INVENTION

As referred to above, FIG. 1 shows a conventional solution of an ignition 10 normally fed by the coil 11 of a voltage generator, to provide the electric energy necessary for a sparking the plugs 12 of a combustion engine. The ignition circuit 10 is enabled by an electronic alarm system comprising an electronic card 14 supplied by a battery 15 for reading a coded signal provided by a transponder 18 provided inside the ignition key 19 via its own antenna inductively coupled to an antenna 16 in the ignition console 17 of the vehicle; according to this known solution, the electronics for reading the coded signal enabling the ignition 10 to spark must necessarily be powered by the external battery 15, while the ignition enabling signal is transmitted, via the same connecting wires, to the engine-stop device 20; it is obvious that, by cutting the wires connecting the alarm system to the engine-stop device, it is possible to activate the ignition circuit.

Figure 2:
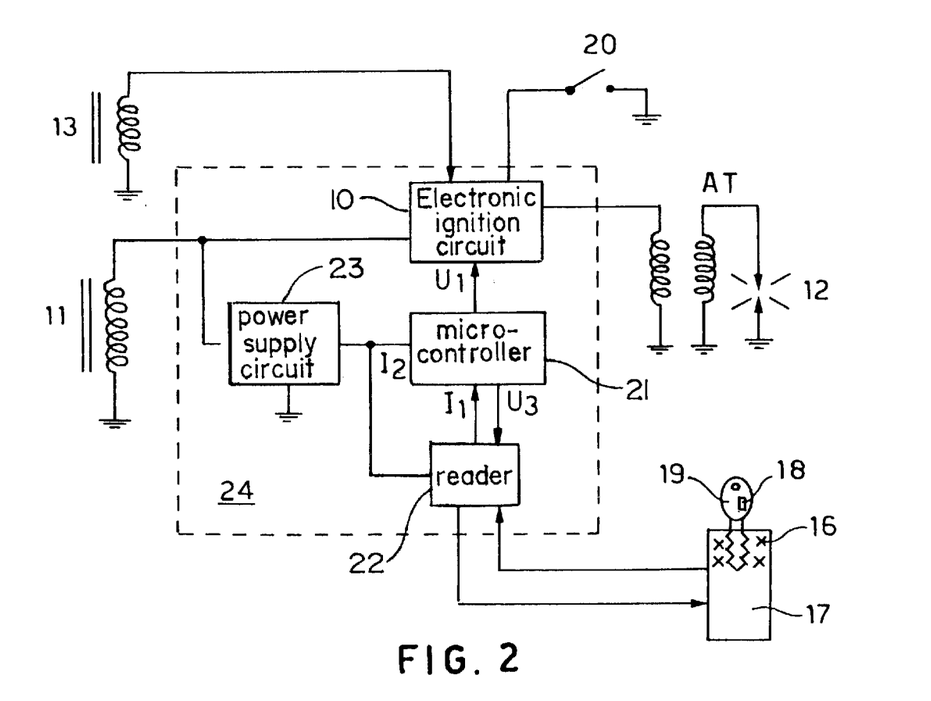
FIG. 2 is a block diagram of the combined ignition device and alarm system according to the invention.

With reference to FIG. 2, we shall now describe the general features of the electronic ignition device for motorcycles combined with an alarm system according to the present invention.

Figure 3:
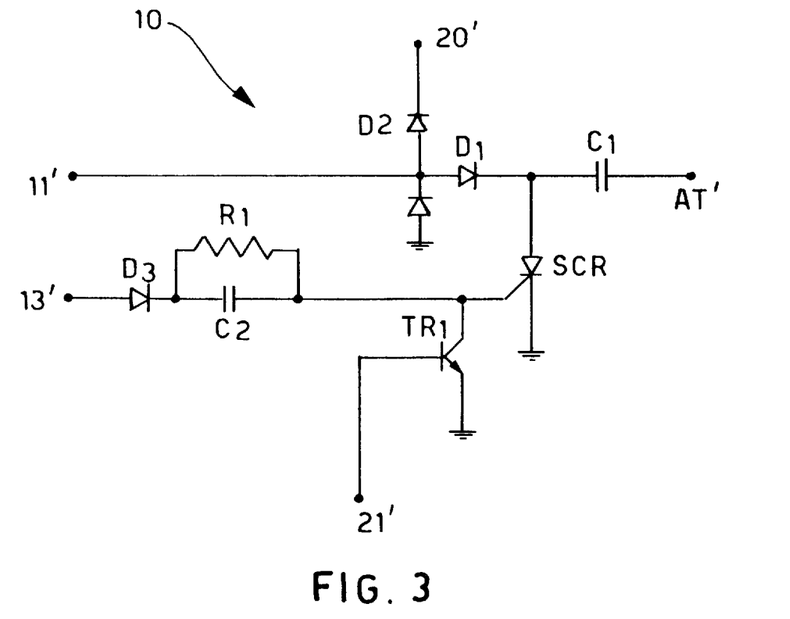
FIG. 3 shows, by way of example, a capacitive-discharge ignition circuit designed to be used as per the block diagram in FIG. 2.
Figure 4:
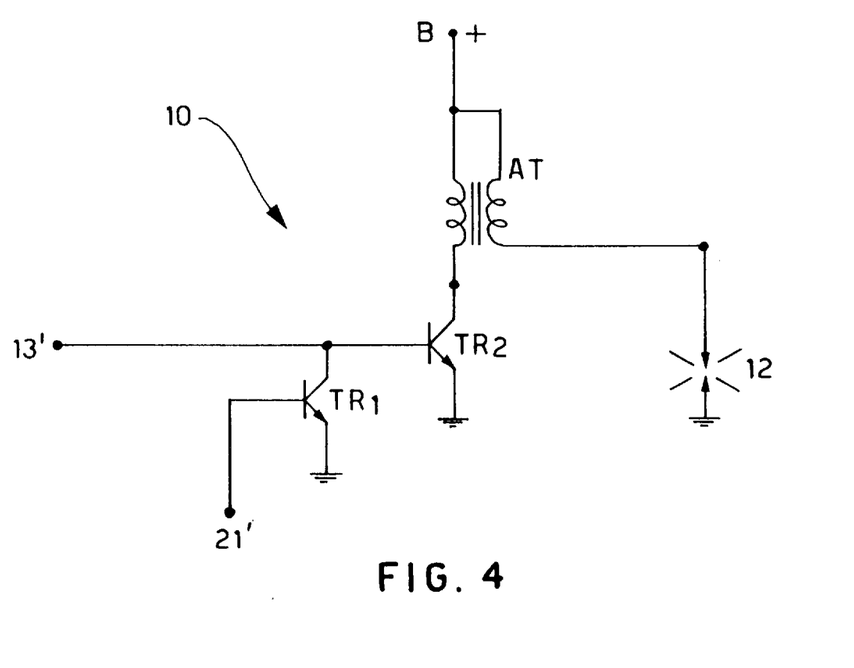
FIG. 4 shows, by way of example, an inductive-discharge ignition circuit suitable for the block diagram of FIG. 2.

In FIG. 2, reference 10 denotes an electronic ignition circuit for motorcycles, for example of capacitive-discharging type shown by way of example in FIG. 3, or of inductive-discharging type shown in the example of FIG. 4; the ignition circuit 10 is suitably connected to a power supply coil 11 of a voltage generator operated by the internal-combustion engine, for supplying power to the sparking plugs 12 via a high-voltage coil AT, under the control of a timing pick-up 13 known per se. In FIG. 2, reference 20 again denotes an engine-stop device acting on the ignition circuit 10, independently of the alarm system circuit.

The ignition circuit 10 shown in FIG. 2 is enabled and disabled by an alarm system comprising a microcontroller 21 having an output U1 connected to an enabling input of the ignition circuit 10; the microcontroller 21 is provided with an electrically erasable EEPROM memory programmed to provide a control signal for enabling or disabling the operation of the ignition circuit 10. The microcontroller 21 in turn receives at its data input I1 connected to a reader 22 a coded signal emitted by the transponder 18 of an ignition key 19, in which the coded signal in turn is received by the reader 22 via the antenna 16 in the ignition console 17 of the motor vehicle.

As shown in the same FIG. 2, the power supply for the microcontroller 21 and the coded signal reader 22 of the alarm system is branched off by the same coil 11 of the voltage generator which supplies voltage to the ignition circuit 10 of the combustion engine during normal running. More particularly, the electric power is supplied to the input I2 of the microcontroller 21 and to an input of the reader 22 via a power supply circuit 23 shown in detail in FIG. 6, which is designed to store power in a capacitor and supply it to the microcontroller 21 and to the reader 22 in a controlled way, said power supply circuit 23 being energized constantly during running of the combustion engine without negatively affecting or compromising the performance of the ignition circuit 10.

According to a feature of the present invention, the assembly consisting of the ignition circuit 10, the microcontroller 21, the coded-signal reader 22 and the power supply circuit 23 constitutes a single unit which may be advantageously closed within a protective casing 24 which cannot be tampered with, thus preventing access both to the entire alarm system and to the ignition circuit.

FIG. 3 of the accompanying drawings shows, by way of example, a first method of controlling an electronic capacitive-discharge ignition which can be used with the combined alarm system according to FIG. 2.

In the case of FIG. 3, the ignition circuit 10 substantially comprises a discharge capacitor C1 connected, on one side via the diode D1 to the terminal 11' of the voltage generator coil 11, and on the other side to the terminal AT' of the high-voltage coil AT which supplies the discharge current to the sparking plugs 12. The terminal 11' of the supply coil 11 is also connected, via the diode D2, directly to the terminal 20' of the engine-stop device 20.

In a manner known per se, discharging of the capacitor C1 occurs by means of an electronic switch, such as an SCR, the control electrode of which is connected to the terminal 13' of the pick-up 13 via a peak detector R1, C2 and the diode D3; enabling and disabling operations of the ignition circuit are managed by the microcontroller 21, the enabling control signal of which is sent to a terminal 21' connected to the base of a transistor TR1 or other equivalent electronic switch, the collector-emitter circuit of which is branched from the peak detector circuit supplying the SCR control electrode.

FIG. 3 shows, therefore, a first system for keeping in the inhibited state a capacitive-discharge circuit until the coded signal emitted by the transponder in the ignition key 19 is identified.

In this case the enabling signal is sent to the transistor TR1 which prevents the SCR at the discharging circuit of the ignition capacitor C1, from conducting until this transistor is actuated by the microcontroller 21; as soon as the coded signal emitted by the transponder is recognised as valid, the microcontroller 21 deactivates the transistor TR1, enabling in this manner operation of the ignition circuit 10.

Another possible system for keeping in the inhibited state an ignition circuit 10 of capacitive-discharge type is shown in FIG. 4 of the accompanying drawings. In this case the primary winding of the coil AT which stores the magnetic energy to be transferred to the sparking plugs 12 by the secondary winding of the same coil AT, is directly connected to the positive terminal B of a battery or to a multiple-phase generator where the output voltage has a very low ripple, i.e. can be compared to a direct voltage, or may be connected to the earth via the collector-emitter circuit of a transistor TR2 the base of which is connected to the terminal 13' from where the ignition control signal is received. In this case also, the enabling control signal is sent by the microcontroller 21 to the base of the transistor TR1 which disables TR2 or other equivalent electronic switch, preventing it from conducting for as long as the transistor TR1 is actuated by the microprocessor 21.

Figure 5:
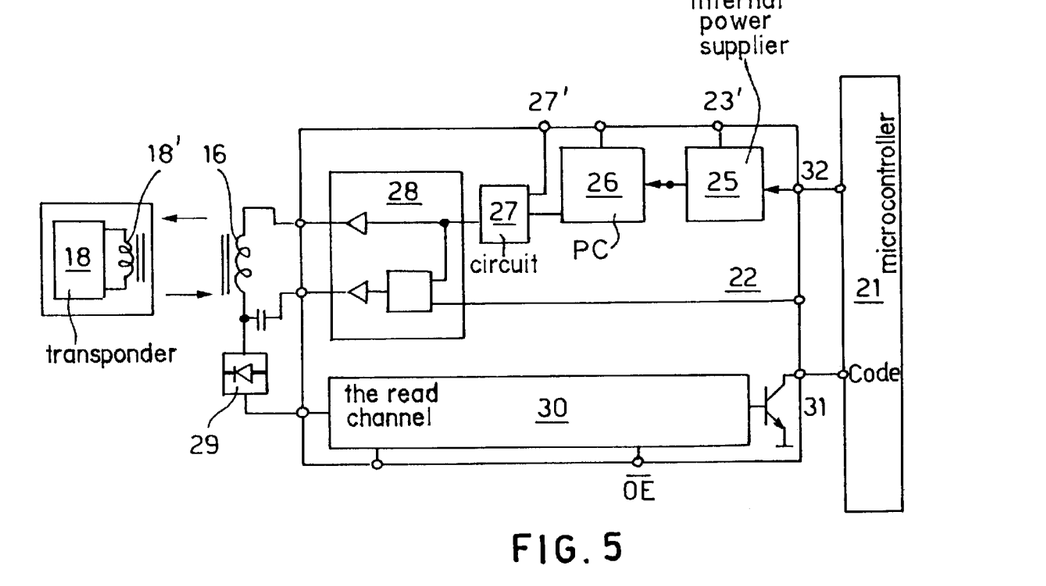
FIG. 5 shows, in greater detail, an example of the code reading device for the transponder of the ignition key.

With reference now to FIG. 5, we shall briefly describe the system for sending and receiving coded signals between the transponder 18 of the ignition key 19 of the motor vehicle, and the reader 22. A possible reader which can be used in combination with the ignition circuit consists, for example, of the combined circuit U2270B of TEMIC, which operates as interface between the microcontroller 21 and the transponder 18 made by the same company.

The reader 22 substantially comprises an internal power supplier 25, the terminal 23' of which is fed by voltage from the feeding circuit 23 of FIG. 2, in order to supply an oscillator 26 which, via the circuit 27 designed to receive at 27' the enabling signal, operates a driver 28 for emitting a carrier wave to a transmitting and receiving antenna consisting of the coil 16.

The coil 16 is in turn inductively coupled both during sending of the carrier wave to the transponder 18 and during receiving of the coded signal, with the corresponding transmitting and receiving antenna of the transponder, consisting of the coil 18'.

The coded signal modulated in Manchester code by the transponder 18, received by the coil 16, is sent, via the diode 29 to a reading logic 30 which demodulates, squares and outputs said coded signal to the CODE terminal of the microcontroller 21.

The oscillator 26, the output of which is enabled by the circuit 27 controlled at 27' by an enabling signal, operates the driver 28 which sends a carrier wave to the coil 16, typically at a frequency of 125 Khz.

The same coil 16 of the antenna receives, as an input signal, the modulated signal emitted by the antenna 18' of the transponder which, detected by the corresponding diode 29, is then sent to the read channel 30 which amplifies and converts it into a corresponding digital output 31 for the microprocessor; this section of the reader 22 also provides a signal for enabling the output OE; a standby connection 32 is also provided between the microcontroller 21 and the power supplier 25 inside the coded signal reader.

Within the scope of the present application, the most serious problem has proved to be powering of the alarm system by the voltage generator with which a motor is normally provided: in fact, the voltage generators currently used in motorcycles are provided with a coil for supplying the ignition circuit, capable of delivering a current of round about 100 mArms maximum. This coil must therefore be able to supply not only the ignition circuit 10, but also the alarm system circuit without compromising the performance of the ignition, i.e. without causing a significant drop in the performance of the spark for the internal combustion engine during normal running conditions.

Figure 6:
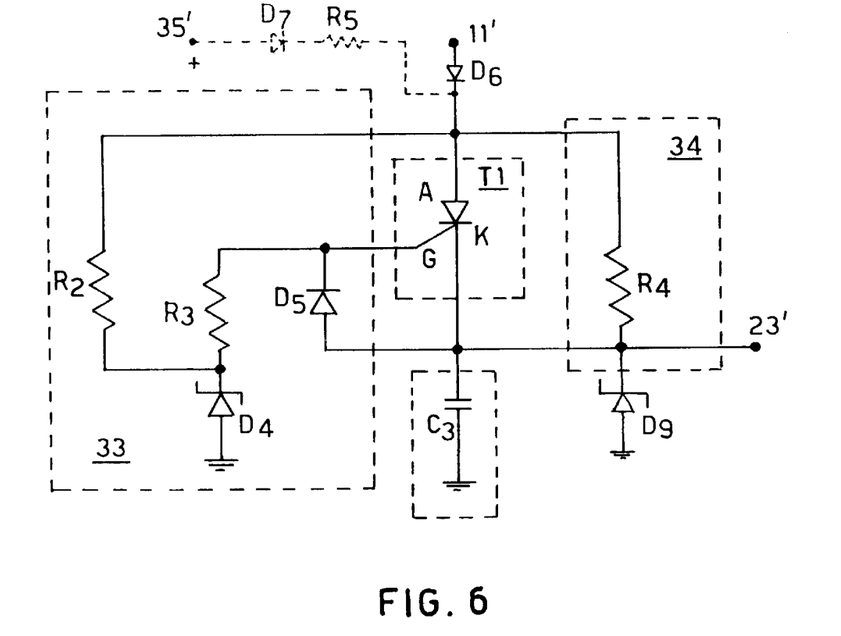
FIG. 6 shows a possible embodiment of a power supply circuit for the alarm system forming part of the present invention.

A possible solution of the power supply circuit 23 for the alarm system is shown in FIG. 6 of the accompanying drawings.

The circuit of FIG. 6 substantially comprises a first energy storing section consisting of a capacitor C3 which can be connected to the terminal 11' of the coil 11 of the voltage generator of the motor vehicle, via a first low-impedance circuit comprising an electronic trigger switch T1 which may be activated and deactivated by a control section 33 for controlling the charging voltage of the capacitor C3, the value of which is established by the Zener diode D4; the control section 33 comprises the resistors R2 and R3 as well as the diode D5 for protection against reverse polarization of the GATE-CATHODE junction G-K of T1.

The power supply circuit 23, in addition to the control circuit 33 for controlling the charging voltage of the capacitor C3, comprises a high-impedance circuit 34 for maintaining the charged state of C3, connected in parallel to the electronic trigger switch T1, which allows to supply the output terminal 23' with a current having a very low value and remarkably less than the charging current provided at C3 via the low-impedance circuit T1, sufficient for keeping the voltage of the capacitor C3 at the desired value for the output 23' supplying the microcontroller 21 and the reader 22, without thereby causing eccessive draining of current by the ignition circuit; in this way it is avoided compromising the performance of the ignition itself. Therefore, the value of the impedance of the circuit 34 maintaining the charged state of the capacitor C3 must be considerably higher than the impedance of the charging circuit T1 and be suitably calculated during the planning stage.

The diode D6 has the function of avoiding the discharging of the capacitor C3 via the power supply generator 11 when the latter is at a voltage lower than that of C3.

Operation of the entire ignition device for motorcycles with a combined transponder-type electronic alarm system is substantially as follows: during the first revolutions of the internal-combustion engine, upon start-up, the electronic switch T1 of the power supply circuit shown in FIG. 6 is actuated by the current flowing via the resistors R2 and R3 connected to its control electrode; since the circuit of the switch T1 operates at low impedance, considerably less than that of the circuit 34, it thus allows rapid charging of the capacitor C3, practically within the space of one or two revolutions of the engine.

The charging voltage of the capacitor C3 is regulated by the Zener D4 which keeps it at a predetermined value; during charging of the capacitor, the circuit is energized thus allowing charging to be performed within the space of a few revolutions of the combustion engine, when the ignition circuit is not yet activated.

When the voltage defined by the Zener diode D4 is reached on the capacitor C3, the voltage between Gate G and the Cathode K of the electronic switch T1 falls until the latter is prevented from conducting, thus allowing energy to be stored into the discharging capacitor C1 connected at AT' to the coil AT of the ignition circuit shown in FIG. 3, since no or very little current supplied by the coil 11 of the motor-vehicle voltage generator is now drained towards the supply circuit 23 of the microcontroller 21 and the reader 22 of the alarm system. A Zener diode D9 or other voltage control circuit for limiting the charging voltage of C3 may be branched at the outlet 23' (FIG. 6) of the power supply circuit 23, as a protection against high voltages supplying the microcontroller 21 and the read circuit 22.

During reading of the ignition-key identification code, no power must be supplied to the high voltage coil AT connected the spark plug 12, so that the microcontroller 21 is able to keep the ignition circuit 10 in the disabled condition via the switch TR1.

After identification of the code and therefore after the ignition circuit 10 has been enabled, the microcontroller 21 sets the reader 22 to standby at the output U3; in this way the amount of current for the alarm system is drastically reduced and the power supply may be maintained via the diode D6 and the resistor R4 with a high resistance value (about 10–100 $K^{\Omega}$) causing a minimum drop in the current of the ignition circuit.

As referred to above, the switch T1 may be in the form of an electronic trigger switch which is initially conductive, forming a low-impedance circuit to allow the rapid charging of the supply capacitor C3, and then opened owing to the control signal received from the voltage control circuit 33 when a desired voltage value is reached on the capacitor C3.

At this point, the high-impedance circuit 34 connected in parallel to T1 intervenes allowing draining of a smaller amount of current from the voltage generator during running conditions, when the alarm system is in standby, without significantly affecting the characteristics of the generated sparks. As the electronic trigger switch, it is preferable to use an SCR owing to the smaller dissipation; however, it is possible to use any other type of controlled electronic switch, such as a transistor or a MOS, which are moreover less preferable since they would tend to operate in a more greatly dissipative linear zone than the SCR.

The software with which a memory of the microcontroller 21 is programmed, must therefore be such as to allow not only identification of the ignition key code, or management of the activation or deactivation conditions of the ignition circuit 10 and the reader 22, but must also be programmed to allow storage of the coded signals of a predetermined number of transponders; this is useful if the key is lost or should it be necessary to store an additional transponder key.

The procedure necessary for this operation involves the use of a special transponder key, which we shall refer to as "programming enable key", by means of which it is possible to generate a code established in advance and stored in the memory of the microcontroller. With this programming enable key, after energization of the ignition with the combined alarm system, it is possible to set the entire system for storage, in the EEPROM, of codes for new keys, without modifying the ignition hardware.

Figure 7:
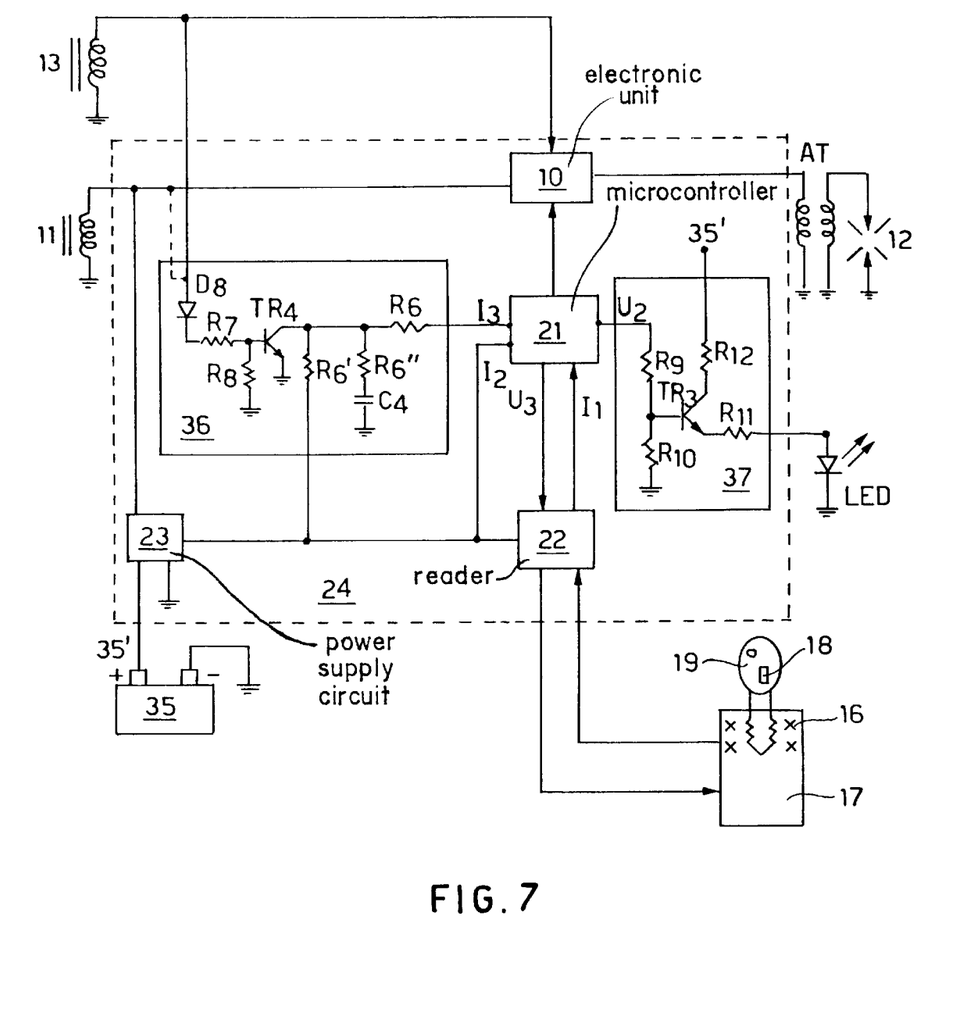
FIG. 7 shows a further embodiment of the combined ignition and alarm system according to the invention.

FIG. 7 shows a variant of the ignition circuit combined with transponder alarm system, provided with an LED designed to indicate the activated state of the alarm system and controlled by an engine rotation detection system.

It is often the case that it is requested to have an LED arranged on the instrument panel which flashes when the vehicle is at a standstill so as to indicate the presence and activation of the alarm system itself.

In order to realize this variant of the invention it is obviously indispensable to power the circuit with an external battery 35, so as to provide the above mentioned warning LED with the possibility of operating when the engine is at a standstill.

In order to achieve this, it is possible to use the block diagram according to FIG. 7 which substantially shows the previous diagram of FIG. 2, in which an input of the power supply circuit 23 is connected to the terminal 35' of a battery 35, via a diode D7 and a resistor R5 (FIG. 6) for isolation from the remaining power supply circuit of the generator 11.

In this way the blocks 21 and 22 are powered by the battery 35 when the latter is present and are powered by the supply coil 11 of the voltage generator as described above when the battery itself is not connected.

The microcontroller 21 in this case is designed for an additional output U2 of an enable signal for a block 37 controlling energization of the LED by the battery 35. The high or low output U2 of the microcontroller 21 is provided, via a voltage divider R9, R10, to the base of a transistor TR3 which operates a warning LED external to the ignition and alarm system, causing it to flash at a frequency defined by the software of the microcontroller 21. In particular, as shown in FIG. 7, the LED can be connected to the terminal 35' of the battery, via the collector-emitter circuit of TR3, or other electronic switch, in series with the resistors R11 and R12.

With this variant two additional problems are posed:
the LED must flash only when the vehicle is at a standstill;
the system must be set for reading of the key 19 as soon as the engine is started, so as to avoid the same system constantly be in the read state with a consequent unnecessary high consumption of current which may cause discharging of the battery within a short period of time.

In order to solve both problems, it is necessary to use a device which is able to detect the running of the engine and transfer this information to the microcontroller 21 so as to provide an enable signal to the circuit 37 powering the LED, depending on a signal sent to the data input I3 of the microcontroller 21, by a circuit 36 for detecting the voltage on the pick-up 13 or on the coil 11 of the voltage generator, indicating turning of the engine.

A possible constructional form may be achieved with the circuit 36 of FIG. 7, designed to detect the presence of voltage on the pick-up 13 or on the generator coil 11 (engine turning) or to output a signal to the microcontroller 21. This circuit substantially comprises a capacitor C4 branched from the collector of a transistor TR4, and charged by the power supply circuit 23 via the resistors R6' and R6" which determine the charging time thereof. When the engine is at a standstill, the transistor TR4, the collector-emitter circuit of which is connected to a data input I3 of the microcontroller 21, is switched off and the input I3 of the microcontroller 21 is high, indicating the status of the engine.

When the engine is made to turn by means of a kick-start or by operation of a starter motor, the transistor TR4 is saturated, its base being connected via the diode D8 to the pick-up 13 or alternatively to the voltage generator 11, as shown in broken lines in FIG. 7; this causes discharging of the capacitor C4 on the collector-emitter circuit of the transistor TR4 via the resistor R6", causing the input I3 to go low and providing information to the microcontroller on the new status of the engine, which is now running.

When the engine is stopped, TR4 is no longer activated by the signal from the generator 11 or from the pick-up 13 and is switched off, allowing charging of C4 and causing the input I3 to go high.

In order to ensure correct operation of this circuit, the time constant for charging of C4 (determined by C4, R6', R6") must be greater than its discharging constant (determined by C4, R6") via TR4.

The rapid discharging and slow charging of C4 ensures the low level of I3 even at low running speeds.

The capacitor C4 therefore provides the input I3 of the microcontroller 21 with information on the running status of the engine, following which the microcontroller 21 outputs at U2 a consent signal to the circuit 37 for battery-powering of the LED and another consent signal to the read block 22 via the corresponding standby signal on its output U3.

When the input I3 of the microcontroller is low, by means of suitable software, it sets the system for reading of the transponder activating the reader 22 and deactivating the warning LED.

If the transponder has a correct code, the microcontroller 21 enables the ignition 10 and disables the reader 22 and the LED lamp; otherwise, after a few revolutions the engine stops, the input I3 of the microcontroller responsible for detecting rotation goes high again and the microcontroller disables the reader 22 and re-enables the LED warning lamp.

Initial turning of the engine is performed by means of a kick-start or by means of operation of the vehicle's starter motor.

With this system the information regarding running of the engine is supplied to the microcontroller by a control device inside the ignition and alarm system, thus avoiding further external wiring.

It should be noted that if the system according to FIG. 7 is not battery-powered, the battery functions correctly as per the system shown in FIG. 2, receiving power from the generator for all its ignition functions with the combined alarm system, except obviously for operation of the warning LED.

What is claimed is:

1. Electronic ignition and alarm system for an internal-combustion engine, of the type comprising an ignition circuit connected to a voltage generator operated to rotate in synchronism with the internal-combustion engine, the alarm system comprising an electronic read circuit for reading a coded signal emitted by an integrated circuit inside an ignition key, which can be connected both to the aforementioned coded-signal read circuit and a microcontroller for identifying the coded signal, the microcontroller having enabling signal emitting output, connected to an electronic control switch of the ignition circuit for sparking the engine ignition, wherein a power supply device having a voltage output for powering the microcontroller and the electronic read circuit is provided, said powering circuit comprising an energy storage capacitor (C3) to provide voltage supply to said voltage output, the energy storage capacitor being operationally connectable to the voltage generator via a first low-impedance circuit for charging thereof upon start-up of the engine and, respectively, via a second high-impedance circuit for holding the charged state of said capacitor during normal running of the engine, and control means for controlling the charging voltage of storage capacitor, comprising switch means in the low-impedance circuit to connect the storage capacitor to the voltage generator of the engine.

2. Electronic ignition and alarm system according to claim 1, wherein said high-impedance circuit comprises a resistor connected in parallel to said low-impedance circuit, and in that voltage limiting means are provided at the output side of the power supply device for limiting the charging voltage of the energy storage capacitor.

3. Electronic ignition and alarm system according to claim 1, wherein said ignition circuit is of capacitive-discharging type.

4. Electronic ignition and alarm system according to claim 1, wherein said ignition circuit is of the inductive-discharging type.

5. Electronic ignition and alarm system according to claim 1, wherein said electronic switch is an SCR switch.

6. Electronic ignition and alarm system according to claim 1, wherein a standby signal output connection is provided between the microcontroller and a power supply circuit inside the coded-signal read circuit.

7. Electronic ignition and alarm system according to claim 1, wherein it comprises an external light-signal source (LED) indicative of the activated state of the alarm system, said light-signal source (LED) being connectable to a power supply battery by a control circuit comprising electronic switch means activated by an enabling signal at an additional output of the microcontroller, when the vehicle engine is at a standstill.

8. Electronic ignition and alarm system according to claim 7, wherein it further comprises a voltage detecting circuit for detecting the voltage output of a timing pick-up of the voltage generator, to provide an additional data input to the microcontroller comprising information relating to the operational and stopped condition of the engine, and in that said microcontroller is programmed to provide the enabling signal for the electronic switch to connect the light signal source (LED) to the power supply battery depending on corresponding engine stop data supplied to said additional data input of the microcontroller or, to put on standby the electronic read circuit of the coded signal emitted by the integrated circuit inside the ignition key.

9. Electronic ignition and alarm system according to claim 8, wherein the ignition circuit, the microcontroller, the coded-signal read circuit and said power supply battery are enclosed in a single protective housing.

10. Electronic ignition and alarm system according to claim 9, wherein the control circuit for controlling battery powering of the light-signal source (LED) and the detecting circuit for detecting the operational state of the engine, are enclosed in said protective housing.

11. Electronic ignition and alarm system according to claim 1, wherein the microcontroller comprises a memory programmed for managing the activated and deactivated conditions of the ignition circuit and the coded-signal read circuit, respectively for storing coded signals generated by a predetermined number of generating integrated circuits, each of said integrated circuits being associated with a respective start key device.

12. Electronic ignition and alarm system according to claim 1, wherein said integrated circuit for generating the coded signal comprises a transponder circuit inductively connectable to the code read circuit.

13. Electronic ignition according to claim 1, wherein said integrated circuit for generating the coded signal of the ignition key and said circuit for reading the coded signal of the alarm system are connected by electrical contact means.

* * * * *

UNITED STATES PATENT AND TRADEMARK OFFICE
CERTIFICATE OF CORRECTION

PATENT NO. : 5,844,469
DATED : December 1, 1998
INVENTOR(S) : Gianni REGAZZI et al.

It is certified that error appears in the above-indentified patent and that said Letters Patent is hereby corrected as shown below:

Column 9, line 2 (claim 1, line 14), change "said powering circuit" to --said power supply device--.

Column 10, line 13 (claim 9, line 2), change "8," to --1,--.

Column 10, line 14 (claim 9, line 3), change "said power supply battery" to --said power supply device--.

Signed and Sealed this

Twenty-fifth Day of April, 2000

Attest:

Q. TODD DICKINSON

*Attesting Officer*

*Director of Patents and Trademarks*